(12) United States Patent
Hamaguri et al.

(10) Patent No.: US 6,452,627 B1
(45) Date of Patent: Sep. 17, 2002

(54) CALIBRATION PATTERN DISPLAY SYSTEM, AND A SYSTEM AND METHOD FOR CALIBRATING A DISPLAY CHARACTERISTIC MEASUREMENT APPARATUS

(75) Inventors: Kenji Hamaguri, Osaka; Teruo Ichikawa, Gamagori; Kazunari Mizuguchi, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/114,490

(22) Filed: Jul. 13, 1998

(30) Foreign Application Priority Data

Jul. 15, 1997 (JP) .............................................. 9-190195

(51) Int. Cl.⁷ .............................................. H04N 17/00
(52) U.S. Cl. ....................................... 348/180; 348/191
(58) Field of Search .................................. 348/807, 806, 348/746, 745, 602, 190, 191, 187, 188, 180; H04N 3/22, 3/23, 17/00, 9/28

(56) References Cited

U.S. PATENT DOCUMENTS

| | | |
|---|---|---|
| 5,032,769 A | 7/1991 | Kawakami |
| 5,077,600 A * | 12/1991 | Ichigaya ..................... 348/182 |
| 5,440,340 A | 8/1995 | Tsurutani et al. |
| 5,536,192 A | 7/1996 | Byun ............................. 445/3 |
| 5,835,135 A * | 11/1998 | Hamaguri ................... 348/191 |

FOREIGN PATENT DOCUMENTS

JP        08307908        11/1996

OTHER PUBLICATIONS

Korean Patent Office Notice of Reasons for Rejection dated Oct. 18, 2000 with English translation.

* cited by examiner

*Primary Examiner*—Sherrie Hsia
(74) *Attorney, Agent, or Firm*—McDermott, Will & Emery

(57) ABSTRACT

A calibrating system of a display characteristic measurement apparatus includes a calibration pattern display unit for displaying a calibration pattern at substantially the same luminescence characteristic as that of a display apparatus to be measured, an image pickup unit provided in a display characteristic measurement apparatus for picking up a calibration pattern displayed on the display apparatus to generate image data, and a calculator for calculating, based on the generated image data, calibration data for the display characteristic measurement apparatus.

16 Claims, 8 Drawing Sheets

CCD AREA SENSOR

CALIBRATION PATTERN DISPLAY SYSTEM, AND A SYSTEM AND METHOD FOR CALIBRATING A DISPLAY CHARACTERISTIC MEASUREMENT APPARATUS

This application is based on patent application No. 9-190195 filed in Japan, the contents of which is hereby incorporated by reference.

BACKGROUND OF THE INVENTION

This invention relates to a calibration pattern display system for use with a color display characteristic measurement apparatus which picks up an image of a specified measurement image displayed on a color display apparatus such as a color CRT (Cathode Ray Tube) and measures a display characteristic such as a geometric image distortion or a convergence using the picked image, and also to a display characteristic measurement apparatus for a color display apparatus to which the calibration pattern display system is applicable.

Conventionally, there has been known a display characteristic measurement apparatus for measuring a display characteristic such as a convergence of a color display apparatus such as a color CRT, a color LCD (Liquid Crystal Display) or a color PDP (Plasma Display Panel). This display characteristic measurement apparatus includes a color image pickup unit for picking up an image of a specified measurement pattern color-displayed on a color display apparatus to be measured while separating this image into images of respective color components of R (red), G (green) and B (blue), an image processor for conducting a predetermined measurement after processing the images of the respective color components, and a display device for displaying a measurement result.

The display characteristic measurement apparatus calculates a luminous position of a measurement pattern on a display surface of a color CRT to be measured based on a focal point of the measurement pattern on a sensing surface of an image pickup unit and a relative positional relationship between the image pickup unit and the color CRT using the picked image of the measurement pattern, and further calculates the degree of geometric image distortion and a misconvergence amount using the calculation result.

For example, a convergence measurement apparatus operates as disclosed in Japanese Unexamined Patent Publication No. 8-307908. The apparatus picks up an image of a specified white measurement pattern displayed on a color CRT to be measured using a camera provided with a color area sensor such as CCDs. During the image processing, the apparatus calculates a focal point of a measurement point of the measurement pattern on a sensing surface of the color area sensor for every picked image of each color component R, G, B, and calculates a display position of the measurement point of the measurement pattern on a display surface of the color CRT based on the calculation result and the relative position of the camera with respect to the color CRT. The apparatus displays a relative displacement of the display positions of these measurement points.

As described above, the display characteristic measurement apparatus converts the focal point of the measurement point of the measurement pattern on the sensing surface of the image pickup unit into the display position of the measurement position on the display surface of the color CRT to be measured. Accordingly, operation parameters including a displacement of the area sensor with respect to an optical axis, a focal length of a taking lens and a magnification largely influence the above conversion.

Thus, the display characteristic measurement apparatus is calibrated without fail before conducting measurement using a special calibration chart as shown in FIG. 11. FIG. 11 shows a conventional display characteristic measurement apparatus 100. An image of a chart 103 (chart on which a black crosshatched pattern 105 is drawn on an opaque white board) for calibration illuminated by a fluorescent lamp 104 is picked up by an image pickup unit 101 of the display characteristic measurement apparatus 100. The operation parameters in the processing for converting the focal point into the display position using the picked image are determined by an apparatus main body 102.

Since the calibration chart 103 is illuminated by the fluorescent lamp 104 having a luminescence characteristic different from that of the color CRT to be measured in the calibration for the conventional display characteristic measurement apparatus, the operation parameters determined in the calibration do not precisely agree with the operation parameters of the measuring system. This causes a reduction in the measurement accuracy.

Particularly, in the convergence measurement, parameters including, e.g., a focal length of the image pickup unit 101 and a distortion need to be determined according to the luminescence characteristic of the respective color components R, G, B of the color CRT to be measured. However, since the calibration chart 103 is illuminated by a fluorescent white light, it is difficult to precisely determine the operation parameters and there is a specified limit in improving the measurement accuracy.

SUMMARY OF THE INVENTION

It is an object of the present invention to provide a calibration pattern display system, a system and method for calibrating a display characteristic measurement apparatus which have overcome the problems residing in the prior art.

According to an aspect of the present invention, a calibration pattern display system for displaying a calibration pattern to be used for calibrating a display characteristic measurement apparatus for measuring a display characteristic of a display apparatus, the calibration pattern display system comprises a display unit which displays a calibration pattern at substantially the same luminescence characteristic as that of a display apparatus to be measured.

According to another aspect of the present invention, a calibration system for calibrating a display characteristic measurement apparatus for measuring a display characteristic of a display apparatus, the calibration system comprises: a calibration pattern display unit which displays a calibration pattern at substantially the same luminescence characteristic as that of a display apparatus to be measured; an image pickup unit which is provided in a display characteristic measurement apparatus, and picks up a calibration pattern displayed on the display apparatus to generate image data; and a calculator which calculates, based on the image data generated by the image pickup unit, calibration data for the display characteristic measurement apparatus.

According to still another aspect of the present invention, a method for calibrating a display characteristic measurement apparatus for measuring a display characteristic of a display apparatus, the method comprises the steps of: displaying a calibration pattern at substantially the same luminescence characteristic as that of a display apparatus to be measured; picking up a displayed calibration pattern by an image pickup unit of a display characteristic measurement apparatus to be calibrated, and generating image data corresponding to the displayed calibration pattern; calculating, based on the generated image data, a focusing position of the calibration pattern on an image sensing surface of the image pickup unit; and setting, based on a display position of the calibration pattern and a calculated focusing position, an operation parameter for calculating a display characteristic of a display apparatus.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
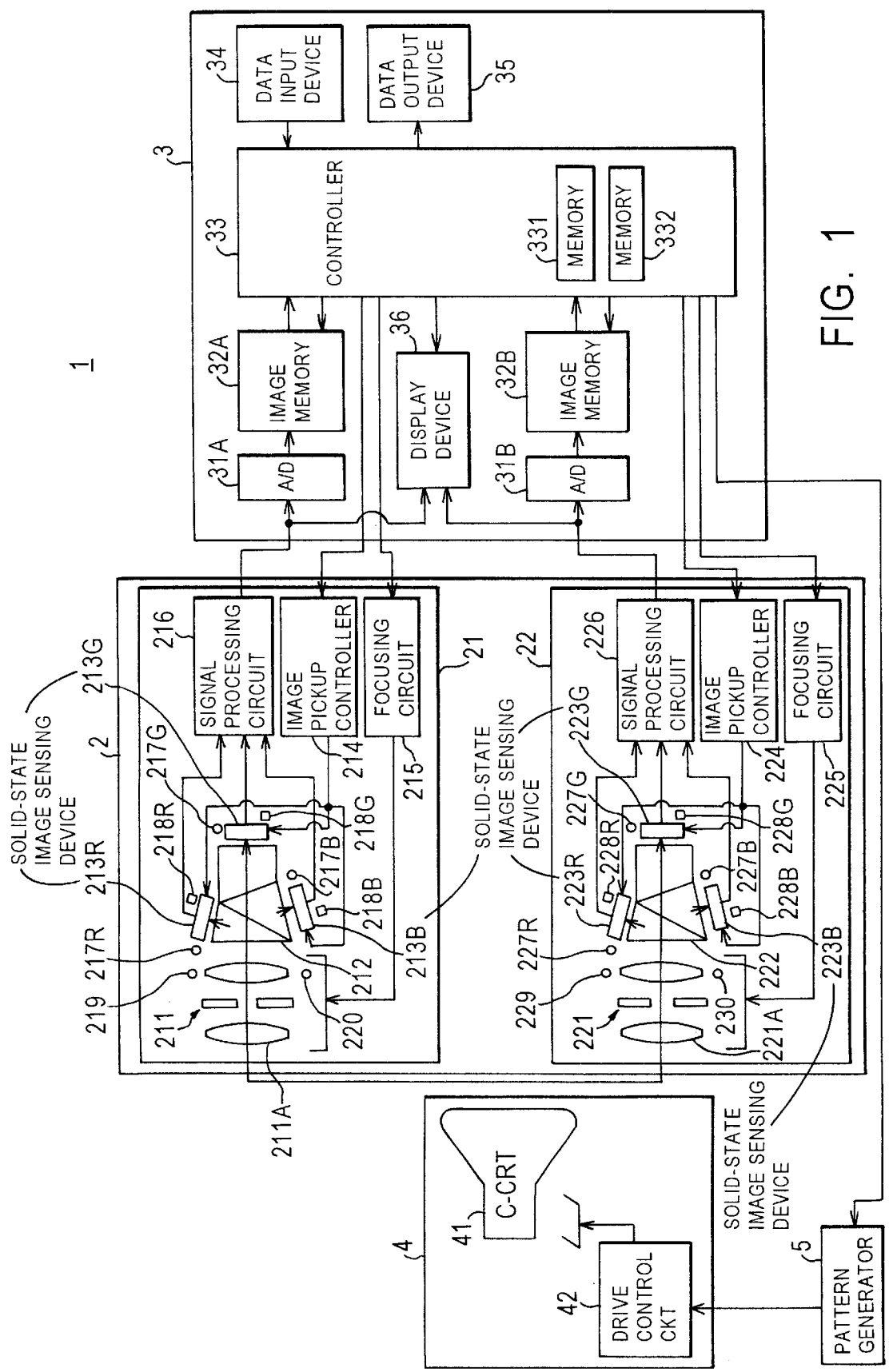
FIG. 1 is a schematic diagram showing a construction of a convergence measurement apparatus for a color CRT embodying the invention.

FIG. 1 shows a convergence measurement apparatus 1 for a color CRT embodying the invention. The convergence measurement apparatus 1 includes an image pickup unit 2 and a measuring unit 3. The image pickup unit 2 picks up an image of a specified measurement pattern (e.g., crosshatched pattern, dot pattern, etc.) displayed on a display surface of a color display 4 to be measured and is provided with a pair of image pickup cameras 21, 22 so as to enable the sensing of images by a stereoscopic method.

The measuring unit 3 calculates a misconvergence amount of the color display 4 using the image data of the measurement pattern obtained by the image pickup unit 2 and displays a calculation result on a display device 36.

The image pickup camera 21 in the image pickup unit 2 is a color image pickup apparatus of three-plate type which is constructed such that a dichroic prism 212 for separating a light into rays of three colors is provided behind a taking lens 211, solid-state image sensing devices 213R, 213G, 213B including CCD area sensors are arranged in positions opposite to emergent surfaces of dichroic prism 212 from which the rays of the respective colors of R, G, B emerge. In vicinity of the solid-state image sensing devices 213R, 213G, 213B are arranged temperature sensors 217R, 217G, 217B for detecting ambient temperatures T of these sensing devices and humidity sensors 218R, 218G, 218B for detecting ambient humidities W thereof. Further, two temperature sensors 219, 220 for detecting a temperature T are arranged in vicinity of the taking lens 211.

Detection signals of the temperature sensors 217R to 217B, 219, 220 and the humidity sensors 218R to 218B are input to a controller 33 of the measuring unit 3.

The image pickup camera 22 is also a color image pickup apparatus of three-plate type similar to the image pickup camera 21. In vicinity of a taking lens 221 and the solid-state image sensing devices 223R, 223G, 223B, are arranged temperature sensors 227R, 227G, 227B, 229, 230. Humidity sensors 228R, 228G, 228B are arranged in vicinity of the solid-state image sensing devices 223R, 223G, 223B. Detection signals of the temperature sensors 227R to 227B, 229, 230 and the humidity sensors 228R to 228B are input to the controller 33 of the measuring unit 3.

In the image pickup unit are also provided an image pickup controller 214 for controlling the operations of the respective solid-state image sensing devices (hereinafter, "CCDs") 213R, 213G, 213B, a focusing circuit 215 for effecting an automatic focusing by driving the taking lens 211, and a signal processing circuit 216 for applying specified image processings to image signals sent from the CCDs 213R, 213G, 213B and outputting them to the measuring unit 3. Likewise, an image pickup controller 224, a focusing circuit 225 and a signal processing circuit 226 are provided in the image pickup camera 22.

The sensing controller 214 is controlled by a sensing control signal sent from the measurement apparatus 3 and controls the image pickup operations (electric charge storing operations) of the CCDs 213R, 213G, 213B in accordance with this sensing control signal. Likewise, the sensing controller 224 is controlled by a sensing control signal sent from the measurement apparatus 3 and controls the image pickup operations of the CCDs 223R, 223G, 223B in accordance with this sensing control signal.

The focusing control circuit 215 is controlled by a focusing control signal sent from the measurement apparatus 3 and drives a front group 211A of the taking lens 211 in accordance with this focusing control signal to focus a light image of the measurement pattern displayed on the display surface of the color display 4 on the sensing surfaces of the CCDs 213R, 213G, 213B. Likewise, the focusing control circuit 225 is controlled by a focusing control signal sent from the measurement apparatus 3 and drives a front group 221A of the taking lens 221 in accordance with this focusing control signal to focus the light image of the measurement pattern displayed on the display surface of the color display 4 on the sensing surfaces of the CCDs 223R, 223G, 223B.

The focusing control is performed, for example, according to a hill-climbing method in accordance with the focusing control signal from the controller 33. Specifically, in the case of, e.g. the image pickup camera 21, the controller 33 extracts, for example, high frequency components (edge portion of the measurement pattern) of the green image picked up by the CCD 213G and outputs such a focusing control signal to the focusing control circuit 215 as to maximize the high frequency components (make the edge of the measurement pattern more distinctive). The focusing control circuit 215 moves the front group 211A of the taking lens 211 forward and backward with respect to an in-focus position in accordance with the focusing control signal, thereby gradually decreasing a moving distance to finally set the taking lens 211 in the in-focus position.

The focusing control is performed using the picked image in this embodiment. However, the image pickup camera 21, 22 may, for example, be provided with distance sensors and the taking lenses 211, 221 may be driven using distance data between the cameras 21, 22 and the display surface of the color display 4 which are detected by the distance sensors.

The measurement apparatus 3 includes analog-to-digital (A/D) converters 31A, 31B, image memories 32A, 32B, the controller 33, a data input device 34, a data output device 35 and the display device 36.

The A/D converters 31A, 31B convert the image signal (analog signals) inputted from the image pickup cameras 21, 22 into image data in the form of digital signals. The image memories 32A, 32B store the image data outputted from the A/D converters 31A, 31B, respectively.

Each of the A/D converters 31A, 31B is provided with three A/D converting circuits in conformity with the image signals of the respective color components R, G, B. Each of the image memories 32A, 32B includes a memory of three frames in conformity with the image data of the respective color components R, G, B.

The controller 33 is an operation control circuit including a microcomputer, and is provided with a memory 331 including a ROM (Read Only Memory) and a memory 332 including a RAM (Random Access Memory).

In the memory 331 are stored a program for the convergence measurement processing (including a series of operations including the driving of the optical system, the image pickup operation, the calculation of the image data) and data (correction values, a data conversion table, etc.) necessary for the calculation. Particularly, a conversion table for setting operation parameters concerning the construction of the image pickup system and the optical system in the image pickup cameras 21, 22 during the calculation of a misconvergence amount (i.e., displacements of the respective sensing surfaces of the CCDs 213R, 213G, 213B, 223R, 223G, 223B with respect to the optical axes, focal lengths of the optical system including the taking lenses 211, 221 and three color separating prisms 212, 222 for the respective color components, principal points of the taking lenses 211, 221 and the relative positional relationship of the taking lenses 211, 221, etc.) based on a temperature characteristic and a humidity characteristic is stored in the memory 331.

This conversion table takes into consideration that the operation parameters concerning the construction of the image pickup system and the optical system vary due to the ambient temperature and ambient humidity, so that the operation parameters corrected based on the temperatures T detected by the temperature sensors 217R to 217B, 227R to 227B, 219, 220, 229, 230 and the humidities W detected by the humidity sensors 218R to 218B, 228R to 228B can be set. The specific contents of the operation parameters are described in detail later.

This conversion table is a table of correction values (relative values) for correcting the operation parameters initially set with respect to, e.g., a standard temperature and a standard humidity. Alternatively, it may be a table of set values (absolute values) of the operation parameters which were calculated in advance with respect to the temperature and humidity changed at specified intervals. In the former conversion table, specified values are initially set as operation parameters in the calibration of the convergence measurement apparatus 1. Accordingly, during the measurement, the operation parameters are corrected by the correction values set based on the ambient temperatures T and the ambient humidities W detected at the start of the measurement using the conversion table. With the latter conversion table, the ambient temperatures T and the ambient humidities W are detected at the start of the measurement. The operation parameters are directly set (i.e., the calibration is simultaneously performed) based on the detection results using the conversion table.

Further, the memory 332 provides a data area and a work area for performing a variety of operations for the convergence measurement.

The misconvergence amount (measurement result) calculated by the controller 33 is stored in the memory 332 and outputted to the display device 36 to be displayed in a predetermined display format. The misconvergence amount can also be outputted to an equipment (printer or an external storage device) externally connected via the data output device 35.

The data input device 34 is operated to input a variety of data for the convergence measurement and includes, e.g., a keyboard. Via the data input device 34, data such as an arrangement interval of the pixels of the CCDs 213, 223 and a position of the measurement point on the display surface of the color display 4 are inputted.

The color display 4 to be measured includes a color CRT 41 displaying a video image and a drive control circuit 42 for controlling the drive of the color CRT 41. A video signal of a measurement pattern generated by a pattern generator 5 is inputted to the drive control circuit 42 of the color display 4, which in turn drives a deflection circuit of the color CRT 41 in accordance with this video signal, thereby causing, for example, a crosshatched measurement pattern as shown in FIG. 2 to be displayed on the display surface.

In this convergence measurement apparatus 1, images of the measurement pattern displayed on the color display 4 are stereoscopically picked up by the image pickup cameras 21, 22 of the image pickup unit 2 and a misconvergence amount is measured using the image data obtained by the image pickup cameras 21, 22.

Next, a method for measuring a misconvergence amount is described, taking as an example a case where a crosshatched pattern is used as a measurement pattern.

Figure 2:
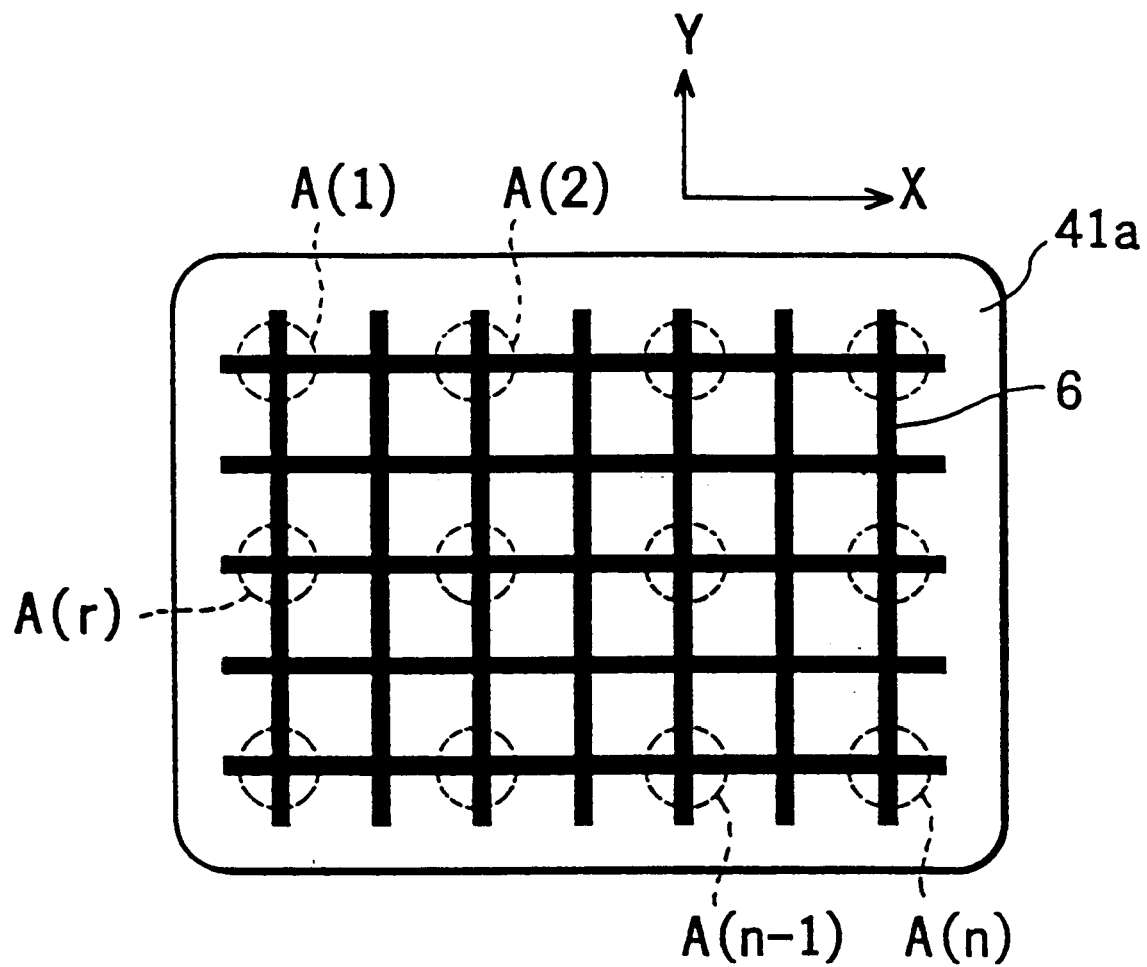
FIG. 2 is a diagram showing a crosshatched pattern displayed on the color CRT.

FIG. 2 is a diagram showing a crosshatched pattern 6 displayed on the color CRT 41. The crosshatched pattern 6 is formed by intersecting a plurality of vertical lines and a plurality of horizontal lines, and is displayed in a suitable size such that a plurality of intersections are included within a display surface 41a of the color CRT 41. Misconvergence amount measurement areas A(1) to A(n) are so set in desired positions within the display surface 41a as to include at least one intersection.

In each measurement area A(r) (r=1, 2, ... n), a horizontal (X-direction in XY coordinate systems) misconvergence amount $\Delta D_X$ is calculated based on a picked image of the vertical line included in this measurement area A(r), and a vertical (Y-direction in XY coordinate systems) misconvergence amount $\Delta D_Y$ is calculated based on a picked image of the horizontal line.

Figure 3:
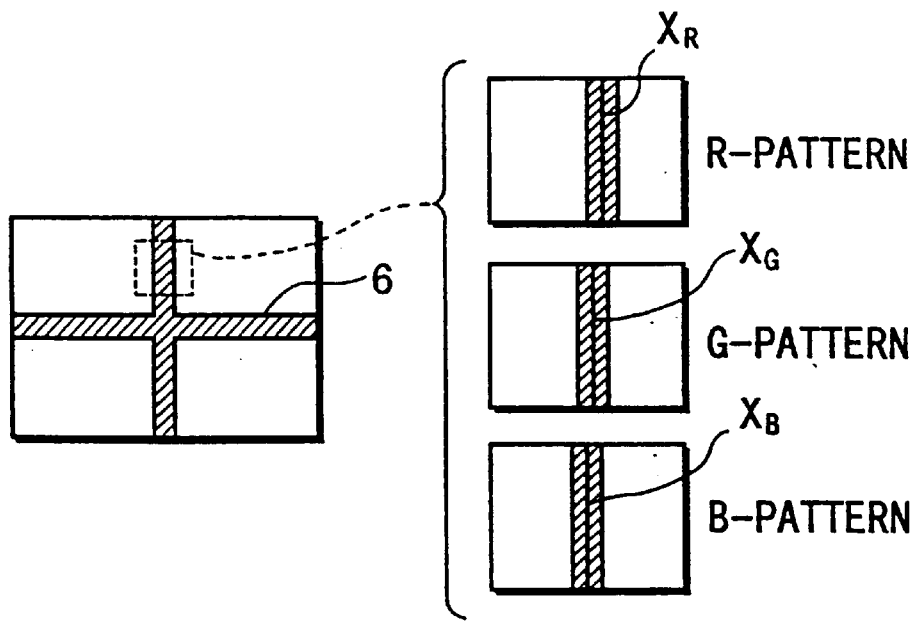
FIG. 3 is a diagram showing a vertical line included in a measurement area separated into lines of the respective color components of R, G, B.
Figure 4:
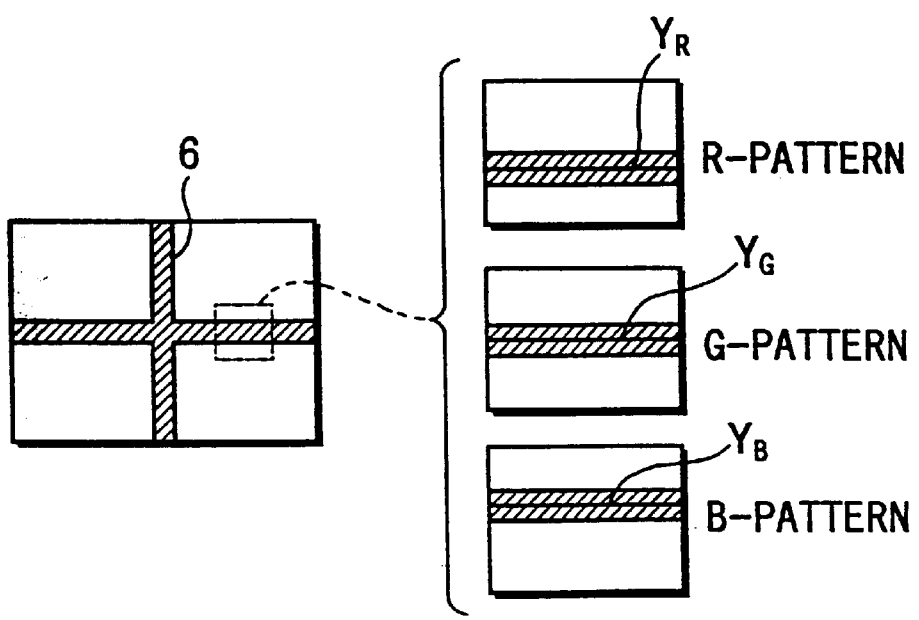
FIG. 4 is a diagram showing a horizontal line included in a measurement area separated into lines of the respective color components of R, G, B.

FIG. 3 is a diagram showing the vertical line included in the measurement area A(r) and separated into lines of the respective color components, and FIG. 4 is a diagram showing the horizontal line included in the measurement area A(r) and separated into lines of the respective color components.

Assuming that $X_R$, $X_G$, $X_B$ denote luminous positions (luminance center positions) of the vertical lines of R, G, B along X-direction on the display surface 41a of the color CRT 41, respectively, the horizontal misconvergence amount $\Delta D_x$ is expressed as displacements $\Delta D_{RGX}(=X_R-X_G)$, $\Delta D_{BGX}(=X_B-X_G)$ of the luminous positions with respect to any of the luminous positions $X_R$, $X_G$, $X_B$, e.g. the luminous position $X_G$ of the color component G.

Further, assuming that $Y_R$, $Y_G$, $Y_B$ denote luminous positions (luminance center positions) of the horizontal lines of R, G, B along Y-direction on the display surface 41a of the color CRT 41, respectively, the vertical misconvergence amount $\Delta D_y$ is expressed as displacements $\Delta D_{RGY}(=Y_R-Y_G)$, $\Delta D_{BGY}(=Y_B-Y_G)$ of the luminous positions with respect to any of the luminous positions $Y_R$, $Y_G$, $Y_B$, e.g., the luminous position $Y_G$ of the color component G.

Next, a specific method for calculating a misconvergence amount is described taking an example a case where the image of the measurement pattern is picked up according to a stereoscopic method.

In order to facilitate the description, the color components at the light emitting side of the color display 4 are written in capital letters of R(red), G(green), B(blue) and those at the light receiving side of the image pickup unit 2 are written in small letters of r(red), g(green), b(blue)

First, the coordinate systems of the convergence measuring system is described. It is assumed that the image pickup unit 2 be arranged in front of the color display 4 as shown in FIG. 5 in order to pick up the image of the measurement pattern displayed on the display surface 41a of the color display 4.

Figure 5:
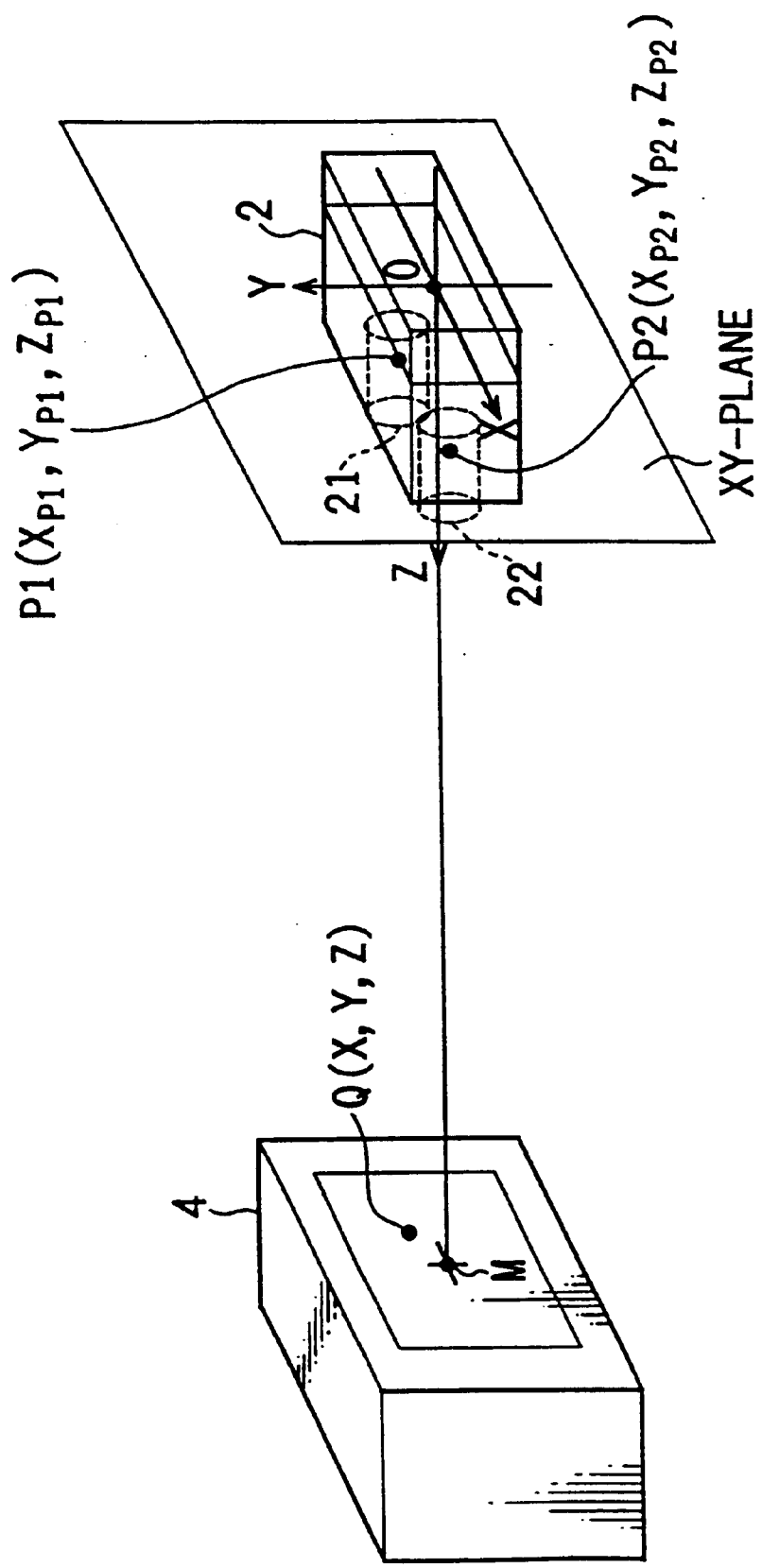
FIG. 5 is a perspective view showing an arrangement of a color display and two image pickup cameras in a convergence measurement by a stereoscopic method.

In FIG. 5, XYZ coordinate systems of the convergence measuring system which have an origin O in an arbitrary position on a normal line passing a center M of the display surface 41a of the color display 4 are set such that Z-axis is parallel to this normal line, Y-axis is parallel to the vertical direction of the display surface 41a, and X-axis is parallel to the horizontal direction of the display surface 41a. It should be noted that (+)-directions of Z-axis, Y-axis and X-axis are a direction from the origin O toward the center M, an upward direction from the origin O and a leftward direction from the origin O when the color display 4 is viewed from the origin O, respectively.

$Q_J(X_J, Y_J, Z_J)$ denotes coordinates of the luminous center (luminance center position) of a phosphor of a color component J (J=R, G, B) at a measurement point Q (e.g., a cross point in a crosshatched pattern or a dot point in a dotted pattern) on the display surface 41a of the color display 4, and $P1(X_{P1}, Y_{P1}, Z_{P1})$, $P2(X_{P2}, Y_{P2}, Z_{P2})$ denote the positions or coordinates of principal points P1, P2 of the taking lenses 211, 221 of the image pickup unit 2.

Figure 6:
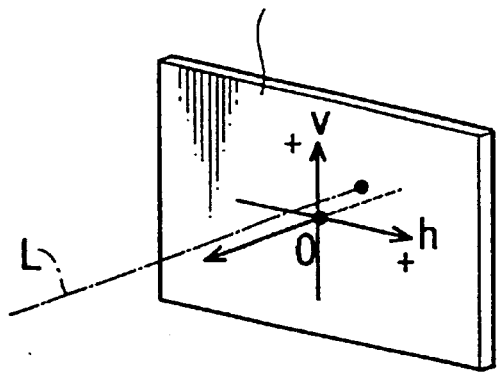
FIG. 6 is a perspective view showing hv coordinate systems defined on a sensing surface of the CCD area sensor.

Further, hv coordinate systems having an origin o in the center of the sensing surface of each of the CCDs 213R, 213G, 213B, 223R, 223G, 223B is set as shown in FIG. 6 such that h-axis is parallel to the vertical direction of the CCD area sensor and v-axis is parallel to the horizontal direction of the CCD area sensor. It should be noted that (+)-directions of v-axis and h-axis are an upward direction and a rightward direction, when facing the sensing surface, from the origin o.

Figure 7:
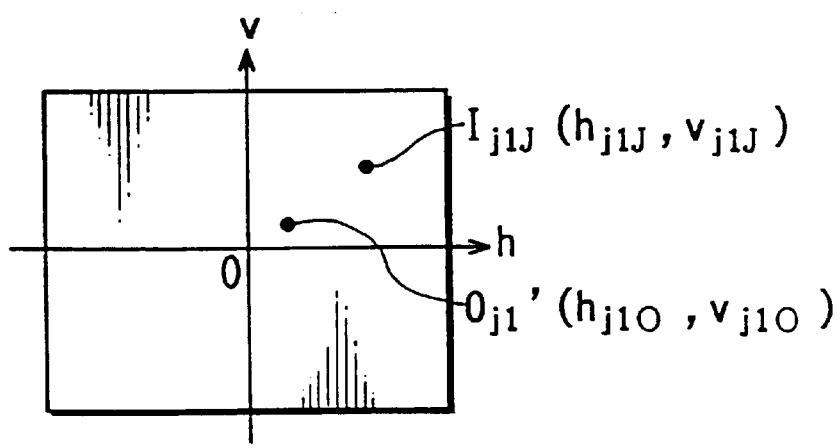
FIG. 7 is a diagram showing coordinates of an optical axis and a focal point on the sensing surface of the CCD area sensor.

Assuming that each sensing surface is displaced from a corresponding optical axis $L_J$ (J=R, G, B, optical axis of color component J) such that the optical axis $L_J$ is incident in a position displaced from the origin o of the hv coordinate systems, coordinates of an incidence point $o_{j1}$, of an optical axis $L_{J1}$ on the sensing surface of the CCD of the color component j (j=r, g, b) of the image pickup camera 21 and coordinates of an incidence point $o_{j2}$, of an optical axis $L_{J2}$ on the sensing surface of the CCD of the color component j of the image pickup camera 22 are expressed as $(h_{j1O}, v_{j1O})$, $(h_{j2O}, v_{j2O})$, respectively, as shown in FIG. 7. Further, coordinates of a focusing point $I_{j1J}$ of a light image at the measurement point $Q_J$ of the display surface 41a on the sensing surface of the CCD of the color component j of the image pickup camera 21 and coordinates of a focusing point $I_{j2J}$ thereof on the sensing surface of the CCD of the color component j of the image pickup camera 22 are expressed as $(h_{i1J}, v_{i1J})$, $(h_{j2J}, v_{j2J})$, respectively.

Assuming that a, b, f denote a distance from a principal point of a lens to an object, a distance therefrom to an image and a focal length of the lens, there is, in general, a relationship between them: 1/a+1/b=1/f. If y, y' are sizes of the object and the image, respectively, there is a relationship between them: y'/y=b/a. Equation (1) is obtained from the above relationships:

$$y' = y \cdot f/(a-f) \tag{1}$$

By applying Equation (1) to the aforementioned positional relationship of the measurement point $Q_J$ and the focusing points $I_{j1J}$, $I_{j2J}$, Equations (2) to (5) can be obtained.

$$h_{j1J} = h_{j1J} - h_{j1O} = (X_J - X_{P1}) \cdot f_{j1J}/(Z_J - f_{j1J}) \tag{2}$$

where $f_{i1J}$ denotes a focal length of the optical system for the color component j of the image pickup camera 21 with respect to the emission of phosphors of the color J on the display surface 4a.

$$h_{j2J} = h_{j2J} - h_{j2O} = (X_J - X_{P2}) \cdot f_{j2J}/(Z_J - f_{j2J}) \tag{4}$$

$$v_{j2J} = v_{j2J} - v_{j2O} = (Y_J - Y_{P2}) \cdot f_{j2J}/(Z_J - f_{j2J}) \tag{5}$$

where $f_{i2J}$ denotes a focal length of the optical system for the color component j of the image pickup camera 22 with respect to the emission of phosphors of the color J on the display surface 4a.

Next, a method for calculating a misconvergence amount according to the stereoscopic method is described. In order to facilitate the description, a case where the image pickup unit 2 is arranged such that the optical axes L1, L2 of the image pickup cameras 21, 22 are located in XZ-plane is described.

If the principal points P1, P2 are located in XZ-plane, the coordinates thereof are:

$P1(X_{P1}, 0, Z_{P1})$, $P2(X_{P2}, 0, Z_{P2})$ since Y-coordinate is "0".

Equations (6), (7) correspond to Equations (2), (3) with respect to the light image at the measurement point $Q_J$ of the color display 4 and the focusing point $I_{j1J}$ on the image pickup camera 21.

$$h_{j1J} = h_{j1J} - h_{j1O} = (X_J - X_{P1}) \cdot f_{j1J}/(Z_J - f_{j1J}) \tag{6}$$

$$v_{j1J} = v_{j1J} - v_{j1O} = Y_J \cdot f_{j1J}/(Z_J - f_{j1J}) \tag{7}$$

When hv coordinates of the focusing points $I_{r1J}$, $I_{g1J}$, $I_{b1J}$ on the respective sensing surfaces of the CCDs 213R, 213G, 213B are calculated by replacing j of Equations (6), (7) by the color components r, g, b, Equations (8) to (13) can be obtained.

$$h_{r1J}=(X_J-X_{P1})\cdot f_{r1J}/(Z_J-f_{r1J}) \quad (8)$$

$$v_{r1J}=Y_J\cdot f_{r1J}/(Z_J-f_{r1J}) \quad (9)$$

$$h_{g1J}=(X_J-X_{P1})\cdot f_{g1J}/(Z_J-f_{g1J}) \quad (10)$$

$$v_{g1J}=Y_J\cdot f_{g1J}/(Z_J-f_{g1J}) \quad (11)$$

$$h_{b1J}=(X_J-X_{P1})\cdot f_{b1J}/(Z_J-f_{b1J}) \quad (12)$$

$$v_{b1J}=Y_J\cdot f_{b1J}/(Z_J-f_{b1J}) \quad (13)$$

Further, Equations (14), (15) correspond to Equations (2), (3) with respect to the light image at the measurement point $Q_J$ of the color display 4 and the focusing point $I_{j2J}$ on the image pickup camera 22.

$$h_{j2J}=(X_J-X_{P2})\cdot f_{j2J}/(Z_J-f_{j2J}) \quad (14)$$

$$v_{j2J}=Y_J\cdot f_{j2J}/(Z_J-f_{j2J}) \quad (15)$$

When hv coordinates of the focusing points $I_{r2J}$, $I_{g2J}$, $I_{b2J}$ on the respective sensing surfaces of the CCDs 223R, 223G, 223B are calculated by replacing j of Equations (14), (15) by the color components r, g, b, Equations (16) to (21) can be obtained.

$$h_{r2J}=(X_J-X_{P2})\cdot f_{r2J}/(Z_J-f_{r2J}) \quad (16)$$

$$v_{r2J}=Y_J\cdot f_{r2J}/(Z_J-f_{r2J}) \quad (17)$$

$$h_{g2J}=(X_J-X_{P2})\cdot f_{g2J}/(Z_J-f_{g2J}) \quad (18)$$

$$v_{g2J}=Y_J\cdot f_{g2J}/(Z_J-f_{g2J}) \quad (19)$$

$$h_{b2J}=(X_J-X_{P2})\cdot f_{b2J}/(Z_J-f_{b2J}) \quad (20)$$

$$v_{b2J}=Y_J\cdot f_{b2J}/(Z_J-f_{b2J}) \quad (21)$$

The coordinate $X_J$ is calculated as in Equation (22) by eliminating $f_{r1J}/(Z_J-f_{r1J})$, $f_{r2J}/(Z_J-f_{r2J})$ and $Y_J$ from Equations (8), (9), (16), (17).

$$X_J=(v_{r1J}\cdot h_{r2J}\cdot X_{P1}-v_{r2J}\cdot h_{r1J}\cdot X_{P2})/(v_{r1J}\cdot h_{r2J}-v_{r2J}\cdot h_{r1J}) \quad (22)$$

Further, the coordinate $Y_J$ is calculated as in Equation (23) by eliminating $f_{r1J}/(Z_J-f_{r1J})$ from Equations (8), (9) and replacing $X_J$ by Equation (22).

$$Y_J=v_{r1J}\cdot v_{r2J}\cdot (X_{P1}-X_{P2})/(v_{r1J}\cdot h_{r2J}-v_{r2J}\cdot h_{r1J}) \quad (23)$$

If Equation (23) is put into Equation (9) or (17), the coordinate $Z_J$ is calculated as in Equation (24) or (25).

$$Z_J=f_{r1J}+\{f_{r1J}\cdot v_{r2J}\cdot (X_{P1}-X_{P2})/(v_{r1J}\cdot h_{r2J}-v_{r2J}\cdot h_{r1J})\} \quad (24)$$

$$=f_{r2J}+\{f_{r2J}\cdot v_{r1J}\cdot (X_{P1}-X_{P2})/(v_{r1J}\cdot h_{r2J}-v_{r2J}\cdot h_{r1J})\} \quad (25)$$

Equations (22) to (25) are Equations for calculating the XYZ coordinates of the measurement point $Q_J$ on the display surface 41a from the red component images picked by the image pickup cameras 21, 22. Accordingly, if the calculations similar to the above are performed using Equations (10), (11), (18), (19), there can be obtained Equations for calculating the XYZ coordinates of the measurement point $Q_J$ on the display surface 41a from the green component images picked by the image pickup cameras 21, 22. Further, if the calculations similar to the above are performed using Equations (12), (13), (20), (21), there can be obtained Equations for calculating the XYZ coordinates of the measurement point $Q_J$ on the display surface 41a from the blue component images picked by the image pickup cameras 21, 22.

Assuming that the measurement points on the display surface 41a calculated from the picked images of r, g, b of the image pickup unit 2 are $Q_{Jr}$, $Q_{Jg}$, $Q_{Jb}$ and these XYZ coordinates are $Q_{Jr}(X_{Jr}, Y_{Jr}, Z_{Jr})$, $Q_{Jg}(X_{Jg}, Y_{Jg}, Z_{Jg})$, $Q_{Jb}(X_{Jb}, Y_{Jb}, Z_{Jb})$, the respective XYZ coordinates of the measurement points $Q_{Jr}$, $Q_{Jg}$, $Q_{Jb}$ are calculated in accordance with Equations (26) to (37):

$$X_{Jr}=(v_{r1J}\cdot h_{r2J}\cdot X_{P1}-v_{r2J}\cdot h_{r1J}\cdot X_{P2})/(v_{r1J}\cdot h_{r2J}-v_{r2J}\cdot h_{r1J}) \quad (26)$$

$$Y_{Jr}=v_{r1J}\cdot v_{r2J}\cdot (X_{P1}-X_{P2})/(v_{r1J}\cdot h_{r2J}-v_{r2J}\cdot h_{r1J}) \quad (27)$$

$$Z_{Jr}=f_{r1J}+\{f_{r1J}\cdot v_{r2J}\cdot (X_{P1}-X_{P2})/(v_{r1J}\cdot h_{r2J}-v_{r2J}\cdot h_{r1J})\} \quad (28)$$

$$=f_{r2J}+\{f_{r2J}\cdot v_{r1J}\cdot (X_{P1}-X_{P2})/(v_{r1J}\cdot h_{r2J}-v_{r2J}\cdot h_{r1J})\} \quad (29)$$

$$X_{Jg}=(v_{g1J}\cdot h_{g2J}\cdot X_{P1}-v_{g2J}\cdot h_{g1J}\cdot X_{P2})/(v_{g1J}\cdot h_{g2J}-v_{g2J}\cdot h_{g1J}) \quad (30)$$

$$Y_{Jg}=v_{g1J}\cdot v_{g2J}\cdot (X_{P1}-X_{P2})/(v_{g1J}\cdot h_{g2J}-v_{g2J}\cdot h_{g1J}) \quad (31)$$

$$Z_{Jg}=f_{g1J}+\{f_{g1J}\cdot v_{g2J}\cdot (X_{P1}-X_{P2})/(v_{g1J}\cdot h_{g2J}-v_{g2J}\cdot h_{g1J})\} \quad (32)$$

$$=f_{g2J}+\{f_{g2J}\cdot v_{g1J}\cdot (X_{P1}-X_{P2})/(v_{g1J}\cdot h_{g2J}-v_{g2J}\cdot h_{g1J})\} \quad (33)$$

$$X_{Jb}=(v_{b1J}\cdot h_{b2J}\cdot X_{P1}-v_{b2J}\cdot h_{b1J}\cdot X_{P2})/(v_{b1J}\cdot h_{b2J}-v_{b2J}\cdot h_{b1J}) \quad (34)$$

$$Y_{Jb}=v_{b1J}\cdot v_{b2J}\cdot (X_{P1}-X_{P2})/(v_{b1J}\cdot h_{b2J}-v_{b2J}\cdot h_{b1J}) \quad (35)$$

$$Z_{Jb}=f_{b1J}+\{f_{b1J}\cdot v_{b2J}\cdot (X_{P1}-X_{P2})/(v_{b1J}\cdot h_{b2J}-v_{b2J}\cdot h_{b1J})\} \quad (36)$$

$$=f_{b2J}+\{f_{b2J}\cdot v_{b1J}\cdot (X_{P1}-X_{P2})/(v_{b1J}\cdot h_{b2J}-v_{b2J}\cdot h_{b1J})\} \quad (37)$$

As described above, with respect to, e.g., the measurement point $Q_R$ of the red phosphor on the display surface 41a, three measurement points $Q_{Rr}$, $Q_{Rg}$, $Q_{Rb}$ are calculated for every image of the respective color components r, g, b obtained by the image pickup unit 2. Accordingly, if the measurement value of the measurement point $Q_R$ is determined by weighted average values of $Q_{Rr}$, $Q_{Rg}$, $Q_{Rb}$ calculated for every image of the respective color components r, g, b, the XYZ coordinates of the measurement point $Q_R$ are calculated in accordance with Equations (38) to (41):

$$X_R=W_{rR}\{(v_{r1R}\cdot h_{r2R}\cdot X_{P1}-v_{r2R}\cdot h_{r1R}\cdot X_{P2})/(v_{r1R}\cdot h_{r2R}-v_{r2R}\cdot h_{r1R})\}$$
$$+W_{gR}\{(v_{g1R}\cdot h_{g2R}\cdot X_{P1}-v_{g2R}\cdot h_{g1R}\cdot X_{P2})/(v_{g1R}\cdot h_{g2R}-v_{g2R}\cdot h_{g1R})\}$$
$$+W_{bR}\{(v_{b1R}\cdot h_{b2R}\cdot X_{P1}-v_{b2R}\cdot h_{b1R}\cdot X_{P2})/(v_{b1R}\cdot h_{b2R}-v_{b2R}\cdot h_{b1R})\} \quad (38)$$

$$Y_R=W_{rR}\{v_{r1R}\cdot v_{r2R}(X_{P1}-X_{P2})/(v_{r1R}\cdot h_{r2R}-v_{r2R}\cdot h_{r1R})\}$$
$$+W_{gR}\{v_{g1R}\cdot v_{g2R}(X_{P1}-X_{P2})/(v_{g1R}\cdot h_{g2R}-v_{g2R}\cdot h_{g1R})\}$$
$$+W_{bR}\{v_{b1R}\cdot v_{b2R}(X_{P1}-X_{P2})/(v_{b1R}\cdot h_{b2R}-v_{b2R}\cdot h_{b1R})\} \quad (39)$$

$$Z_R=W_{rR}[f_{r1R}+\{f_{r1R}\cdot v_{r2R}\cdot (X_{P1}-X_{P2})/(v_{r1R}\cdot h_{r2R}-v_{r2R}\cdot h_{r1R})\}]$$
$$+W_{gR}[f_{g1R}+\{f_{g1R}\cdot v_{g2R}\cdot (X_{P1}-X_{P2})/(v_{g1R}\cdot h_{g2R}-v_{g2R}\cdot h_{g1R})\}]$$
$$+W_{bR}[f_{b1R}+\{f_{b1R}\cdot v_{b2R}\cdot (X_{P1}-X_{P2})/(v_{b1R}\cdot h_{b2R}-v_{b2R}\cdot h_{b1R})\}] \quad (40)$$

$$=W_{rR}[f_{r2R}+\{f_{r2R}\cdot v_{r1R}\cdot (X_{P1}-X_{P2})/(v_{r1R}\cdot h_{r2R}-v_{r2R}\cdot h_{r1R})\}]$$
$$+W_{gR}[f_{g2R}+\{f_{g2R}\cdot v_{g1R}\cdot (X_{P1}-X_{P2})/(v_{g1R}\cdot h_{g2R}-v_{g2R}\cdot h_{g1R})\}]$$
$$+W_{bR}[f_{b2R}+\{f_{b2R}\cdot v_{b1R}\cdot (X_{P1}-X_{P2})/(v_{b1R}\cdot h_{b2R}-v_{b2R}\cdot h_{b1R})\}] \quad (41)$$

where $W_{rR}$, $W_{gR}$, $W_{bR}$ are weight factors.

Likewise, if the measurement value of the measurement point $Q_G$ is determined by weighted average values of $Q_{Gr}$, $Q_{Gg}$, $Q_{Gb}$ calculated for every image of the respective color components r, g, b, the XYZ coordinates of the measurement point $Q_G$ are calculated in accordance with Equations (42) to (45). Further, if the measurement value of the measurement point $Q_B$ is determined by weighted average values of $Q_{Br}$, $Q_{Bg}$, $Q_{Bb}$ calculated for every image of the respective color components r, g, b, the XYZ coordinates of the measurement point $Q_B$ are calculated in accordance with Equations (46) to (49).

$$X_G = W_{rG}\{(v_{r1G} \cdot h_{r2G} \cdot X_{P1} - v_{r2G} \cdot h_{r1G} \cdot X_{P2})/(v_{r1G} \cdot h_{r2}G' \cdot v_{r2G} \cdot h_{r1G})\}$$

$$+ W_{gG}\{(v_{g1G} \cdot h_{g2G} \cdot X_{P1} - v_{g2G} \cdot h_{g1G} \cdot X_{P2})/(v_{g1G} \cdot h_{g2G} - v_{g2G} \cdot h_{g1G})\}$$

$$+ W_{bG}\{(v_{b1G} \cdot h_{b2G} \cdot X_{P1} - v_{b2G} \cdot h_{b1G} \cdot X_{P2})/(v_{b1G} \cdot h_{b2G} - v_{b2G} \cdot h_{b1G})\} \quad (42)$$

$$Y_G = W_{rG}\{v_{r1G} \cdot v_{r2G} \cdot (X_{P1} - X_{P2})/(v_{r1G} \cdot h_{r2G} - v_{r2G} \cdot h_{r1G})\}$$

$$+ W_{gG}\{v_{g1G} \cdot v_{g2G} \cdot (X_{P1} - X_{P2})/(v_{g1G} \cdot h_{g2G} - v_{g2G} \cdot h_{g1G})\}$$

$$+ W_{bG}\{v_{b1G} \cdot v_{b2G} \cdot (X_{P1} - X_{P2})/(v_{b1G} \cdot h_{b2G} - v_{b2G} \cdot h_{b1G})\} \quad (43)$$

$$Z_G = W_{rG}[f_{r1G} + \{f_{r1G} \cdot v_{r2G} \cdot (X_{P1} - X_{P2})/(v_{r1G} \cdot h_{r2G} - v_{r2G} \cdot h_{r1G})\}]$$

$$+ W_{gG}[f_{g1G} + \{f_{g1G} \cdot v_{g2G} \cdot (X_{P1} - X_{P2})/(v_{g1G} \cdot h_{g2G} - v_{g2G} \cdot h_{g1G})\}]$$

$$+ W_{bG}[f_{b1G} + \{f_{b1G} \cdot v_{b2G} \cdot (X_{P1} - X_{P2})/(v_{b1G} \cdot h_{b2G} - v_{b2G} \cdot h_{b1G})\}] \quad (44)$$

$$= W_{rG}[f_{r2G} + \{f_{r2G} \cdot v_{r1G} \cdot (X_{P1} - X_{P2})/(v_{r1G} \cdot h_{r2G} - v_{r2G} \cdot h_{r1G})\}]$$

$$+ W_{gG}[f_{g2G} + \{f_{g2G} \cdot v_{g1G} \cdot (X_{P1} - X_{P2})/(v_{g1G} \cdot h_{g2G} - v_{g2G} \cdot h_{g1G})\}]$$

$$+ W_{bG}[f_{b2G} + \{f_{b2G} \cdot v_{b1G} \cdot (X_{P1} - X_{P2})/(v_{b1G} \cdot h_{b2G} - v_{b2G} \cdot h_{b1G})\}] \quad (45)$$

where $W_{rG}$, $W_{gG}$, $W_{bG}$ are weight factors.

$$X_B = W_{rB}\{(v_{r1B} \cdot h_{r2B} \cdot X_{P1} - v_{r2B} \cdot h_{r1B} \cdot X_{P2})/(v_{r1B} \cdot h_{r2B} \cdot v_{r2B} \cdot h_{r1B})\}$$

$$+ W_{gB}\{(v_{g1B} \cdot h_{g2B} \cdot X_{P1} - v_{g2B} \cdot h_{g1B} \cdot X_{P2})/(v_{g1B} \cdot h_{g2B} - v_{g2B} \cdot h_{g1B})\}$$

$$+ W_{bB}\{(v_{b1B} \cdot h_{b2B} \cdot X_{P1} - v_{b2B} \cdot h_{b1B} \cdot X_{P2})/(v_{b1B} \cdot h_{b2B} - v_{b2B} \cdot h_{b1B})\} \quad (46)$$

$$Y_B = W_{rB}\{v_{r1B} \cdot v_{r2B} \cdot (X_{P1} - X_{P2})/(v_{r1B} \cdot h_{r2B} \cdot v_{r2B} \cdot h_{r1B})\}$$

$$+ W_{gB}\{v_{g1B} \cdot v_{g2B} \cdot (X_{P1} - X_{P2})/(v_{g1B} \cdot h_{g2B} - v_{g2B} \cdot h_{g1B})\}$$

$$+ W_{bB}\{v_{b1B} \cdot v_{b2B} \cdot (X_{P1} - X_{P2})/(v_{b1B} \cdot h_{b2B} - v_{b2B} \cdot h_{b1B})\} \quad (47)$$

$$Z_B = W_{rB}[f_{r1B} + \{f_{r1B} \cdot v_{r2B} \cdot (X_{P1} - X_{P2})/(v_{r1B} \cdot h_{r2B} - v_{r2B} \cdot h_{r1B})\}]$$

$$+ W_{gB}[f_{g1B} + \{f_{g1B} \cdot v_{g2B} \cdot (X_{P1} - X_{P2})/(v_{g1B} \cdot h_{g2B} - v_{g2B} \cdot h_{g1B})\}]$$

$$+ W_{bB}[f_{b1B} + \{f_{b1B} \cdot v_{b2B} \cdot (X_{P1} - X_{P2})/(v_{b1B} \cdot h_{b2B} - v_{b2B} \cdot h_{b1B})\}] \quad (48)$$

$$= W_{rB}[f_{r2B} + \{f_{r2B} \cdot v_{r1B} \cdot (X_{P1} - X_{P2})/(v_{r1B} \cdot h_{r2B} - v_{r2B} \cdot h_{r1B})\}]$$

$$+ W_{gB}[f_{g2B} + \{f_{g2B} \cdot v_{g1B} \cdot (X_{P1} - X_{P2})/(v_{g1B} \cdot h_{g2B} - v_{g2B} \cdot h_{g1B})\}]$$

$$+ W_{bB}[f_{b2B} + \{f_{b2B} \cdot v_{b1B} \cdot (X_{P1} - X_{P2})/(v_{b1B} \cdot h_{b2B} - v_{b2B} \cdot h_{b1B})\}] \quad (49)$$

where $W_{rB}$, $W_{gB}$, $W_{bB}$ are weight factors.

Accordingly, if Equations (38), (42), (46) are put into the aforementioned misconvergence amounts $\Delta D_{RGX}$ ($=X_R-X_G$), $\Delta D_{BGX}(=X_B-X_G)$, Equations for calculating the horizontal misconvergence amounts $\Delta D_{RGX}$, $\Delta D_{BGX}$ are defined as in Equations (50), (51):

$$\Delta D_{RGX} = X_R - X_G$$

$$= [W_{rR}\{(v_{r1R} \cdot h_{r2R} \cdot X_{P1} - v_{r2R} \cdot h_{r1R} \cdot X_{P2})/(v_{r1R} \cdot h_{r2R} - v_{r2R} \cdot h_{r1R})\}$$

$$+ W_{gR}\{(v_{g1R} \cdot h_{g2R} \cdot X_{P1} - v_{g2R} \cdot h_{g1R} \cdot X_{P2})/(v_{g1R} \cdot h_{g2R} - v_{g2R} \cdot h_{g1R})\}$$

$$+ W_{bR}\{(v_{b1R} \cdot h_{b2R} \cdot X_{P1} - v_{b2R} \cdot h_{b1R} \cdot X_{P2})/(v_{b1R} \cdot h_{b2R} - v_{b2R} \cdot h_{b1R})\}]$$

$$- [W_{rG}\{(v_{r1G} \cdot h_{r2G} \cdot X_{P1} - v_{r2G} \cdot h_{r1G} \cdot X_{P2})/(v_{r1G} \cdot h_{r2G} - v_{r2G} \cdot h_{r1G})\}$$

$$+ W_{gG}\{(v_{g1G} \cdot h_{g2G} \cdot X_{P1} - v_{g2G} \cdot h_{g1G} \cdot X_{P2})/(v_{g1G} \cdot h_{g2G} - v_{g2G} \cdot h_{g1G})\}$$

$$+ W_{bG}\{(v_{b1G} \cdot h_{b2}G' \cdot X_{P1} - v_{b2G} \cdot h_{b1G} \cdot X_{P2})/(v_{b1G} \cdot h_{b2G} - v_{b2}G' \cdot h_{b1G})\}] \quad (50)$$

$$\Delta D_{BGX} = X_B - X_G$$

$$= [W_{rB}\{(v_{r1B} \cdot h_{r2B} \cdot X_{P1} - v_{r2B} \cdot h_{r1B} \cdot X_{P2})/(v_{r1B} \cdot h_{r2B} - v_{r2B} \cdot h_{r1B})\}$$

$$+ W_{gB}\{(v_{g1B} \cdot h_{g2B} \cdot X_{P1} - v_{g2B} \cdot h_{g1B} \cdot X_{P2})/(v_{g1B} \cdot h_{g2B} - v_{g2B} \cdot h_{g1B})\}$$

$$+ W_{bB}\{(v_{b1B} \cdot h_{b2}B' \cdot X_{P1} - v_{b2}B' \cdot h_{b1B} \cdot X_{P2})/(v_{b1B} \cdot h_{b2B} - v_{b2B} \cdot h_{b1B})\}]$$

$$- [W_{rG}\{(v_{r1G} \cdot h_{r2G} \cdot X_{P1} - v_{r2G} \cdot h_{r1G} \cdot X_{P2})/(v_{r1G} \cdot h_{r2G} - v_{r2G} \cdot h_{r1G})\}$$

$$+ W_{gG}\{(v_{g1G} \cdot h_{g2G} \cdot X_{P1} - v_{g2G} \cdot h_{g1G} \cdot X_{P2})/(v_{g1G} \cdot h_{g2G} - v_{g2G} \cdot h_{g1G})\}$$

$$+ W_{bG}\{(v_{b1G} \cdot h_{b2G} \cdot X_{P1} - v_{b2G} \cdot h_{b1G} \cdot X_{P2})/(v_{b1G} \cdot h_{b2G} - v_{b2G} \cdot h_{b1G})\}] \quad (51)$$

Further, if Equations (39), (43), (47) are put into the aforementioned misconvergence amounts $\Delta D_{RGY}(=Y_R-Y_G)$, $\Delta D_{BGY}(=Y_B-Y_G)$, Equations for calculating the vertical misconvergence amounts $\Delta D_{RGY}$, $\Delta D_{BGY}$ are defined as in Equations (52), (53):

$$\Delta D_{RGY} = Y_R - Y_G$$

$$= [W_{rR}\{v_{r1R} \cdot v_{r2R} \cdot (X_{P1} - X_{P2})/(v_{r1R} \cdot h_{r2R} - v_{r2R} \cdot h_{r1R})\}$$

$$+ W_{gR}\{v_{g1R} \cdot v_{g2R} \cdot (X_{P1} - X_{P2})/(v_{g1R} \cdot h_{g2R} - v_{g2R} \cdot h_{g1R})\}$$

$$+ W_{bR}\{v_{b1R} \cdot v_{b2R} \cdot (X_{P1} - X_{P2})/(v_{b1R} \cdot h_{b2R} - v_{b2R} \cdot h_{b1R})\}]$$

$$- [W_{rG}\{v_{r1G} \cdot v_{r2G} \cdot (X_{P1} - X_{P2})/(v_{r1G} \cdot h_{r2G} - v_{r2G} \cdot h_{r1G})\}$$

$$+ W_{gG}\{v_{g1G} \cdot v_{g2G} \cdot (X_{P1} - X_{P2})/(v_{g1G} \cdot h_{g2G} - v_{g2G} \cdot h_{g1G})\}$$

$$+ W_{bG}\{v_{b1G} \cdot v_{b2G} \cdot (X_{P1} - X_{P2})/(v_{b1G} \cdot h_{b2G} - v_{b2G} \cdot h_{b1G})\}] \quad (52)$$

$$\Delta D_{BGY} = Y_B - Y_G$$

$$= [W_{rB}\{v_{r1B} \cdot v_{r2B} \cdot (X_{P1} - X_{P2})/(v_{r1B} \cdot h_{r2B} - v_{r2B} \cdot h_{r1B})\}$$

$$+ W_{gB}\{v_{g1B} \cdot v_{g2B} \cdot (X_{P1} - X_{P2})/(v_{g1B} \cdot h_{g2B} - v_{g2B} \cdot h_{g1B})\}$$

$$+ W_{bB}\{v_{b1B} \cdot v_{b2B} \cdot (X_{P1} - X_{P2})/(v_{b1B} \cdot h_{b2B} - v_{b2B} \cdot h_{b1B})\}]$$

$$- [W_{rG}\{v_{r1G} \cdot v_{r2G} \cdot (X_{P1} - X_{P2})/(v_{r1G} \cdot h_{r2G} - v_{r2G} \cdot h_{r1G})\}$$

$$+ W_{gG}\{v_{g1G} \cdot v_{g2G} \cdot (X_{P1} - X_{P2})/(v_{g1G} \cdot h_{g2G} - v_{g2G} \cdot h_{g1G})\}$$

$$+ W_{bG}\{v_{b1G} \cdot v_{b2G} \cdot (X_{P1} - X_{P2})/(v_{b1G} \cdot h_{b2G} - v_{b2G} \cdot h_{b1G})\}] \quad (53)$$

In order to calculate the misconvergence amounts $\Delta D_{RGX}$, $\Delta D_{BGX}$, $\Delta D_{RGY}$, $\Delta D_{BGY}$ with high accuracy using Equations (50) to (53), displacements of the image pickup cameras 21, 22 from the optical axes $L_{J1}$, $L_{J2}$ corresponding to the respective CCDs 213R to 213B, 223R to 223B, i.e., parameters (hereinafter, "operation parameters") including the hv-coordinates ($h_{j1O}$, $v_{j1O}$, $h_{j2O}$, $v_{j2O}$)(j=r, g, b) of the incident points $o_{j1}$, $o_{j2}$ of the optical axes $L_{J1}$, $L_{J2}$ on the sensing surfaces, the focal lengths $f_{j1J}$, $f_{j2J}$ (j=r, g, b; J=R, G, B) of the optical systems of the image pickup cameras 21, 22 for the respective color components R, G, B and the X-coordinates $X_{P1}$, $X_{P2}$ of the principal points P1, P2 of the taking lenses 211, 221 need to be precisely corrected.

Next, a method for setting operation parameters is described. Among the aforementioned operation parameters, the focal lengths $f_{j1J}$, $f_{j2J}$ are dependent on the spectral characteristics of the taking lenses 211, 221 and the three-color separating prisms 211, 222. Accordingly, it is desirable to use a calibration chart having substantially the same luminescence characteristic as the color display 4 to be measured in the calibration.

Figure 8:
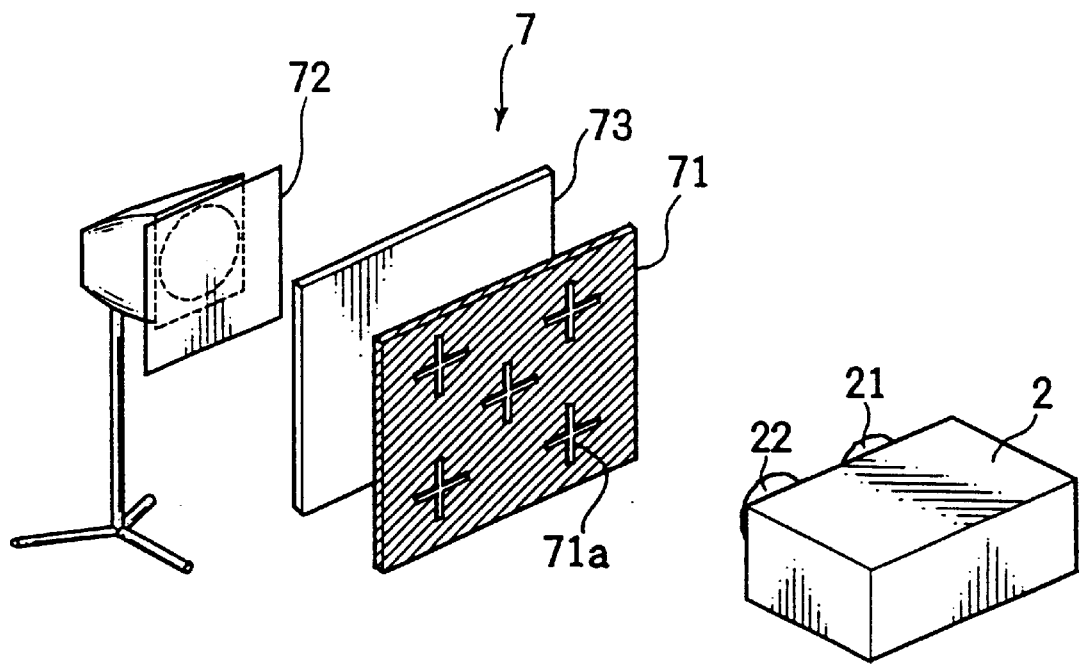
FIG. 8 is a perspective view showing calibration performed by a first calibration pattern display system embodying the invention.

Thus, the convergence measurement apparatus 1 conducts a calibration using a calibration chart shown in FIG. 8. FIG. 8 shows how the convergence measurement apparatus 1 is calibrated using a first calibration pattern display system for displaying a measurement pattern for the calibration.

The calibration pattern display system 7 includes a chart plate 71 for permitting a light to transmit only in specified patterned portions (patterned portions in which a plurality of crosses are discretely arranged in FIG. 8), a light source 72 arranged behind the chart plate 71, and a diffusing plate 73 for diffusing the light emitted from the light source 72. The diffusing plate 73 is not necessarily required, and may be dispensed with.

The light source 72 can emit three pure primary color lights having substantially the same luminescence characteristic as the color display 4 to be measured. A color filter may be exchangeably provided between the chart plate 71 and the diffusing plate 73, so that cross-shaped calibration patterns 71a are displayed in pure color of R, G, B by causing the light source to emit a white light.

The light emitted from the light source 72 is projected on the rear surface of the chart plate 72 at a uniform illuminance after being diffused by the diffusing plate 73. The projected light transmits only the cross-shaped patterned portions 71a of the chart plate 71, with the result that a cross pattern having a specified luminance is displayed.

Figure 9:
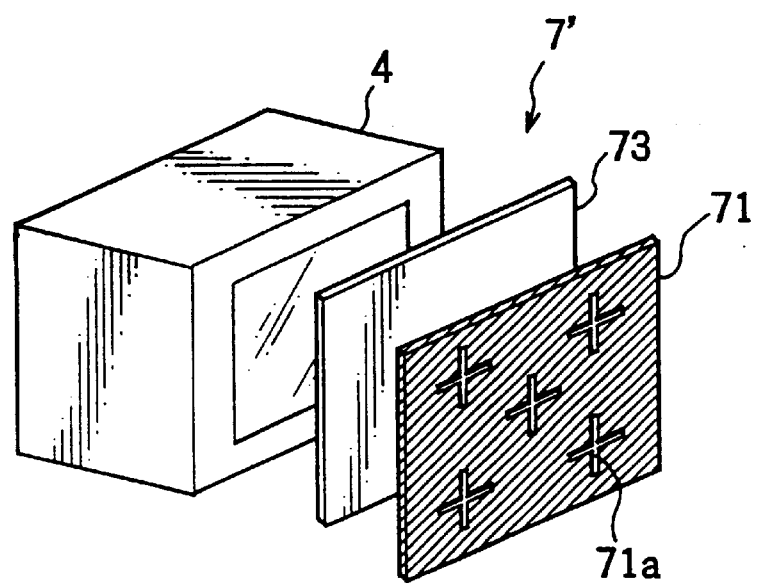
FIG. 9 is a perspective view showing calibration performed by a second calibration pattern display system embodying the invention.

FIG. 9 is a diagram showing a second calibration pattern display system for displaying a measurement pattern for the calibration.

A calibration pattern display system 7' shown in FIG. 9 differs from the one shown in FIG. 8 in that the light source 72 is replaced by the color display 4 to be measured or a color display having substantially the same luminescence characteristic as the color display 4. The cross-shaped calibration patterns 71a are successively displayed in pure colors of R, G, B by making only the phosphors of each color R, G, B luminous on the entire surface.

Since the color display 4 to be measured is used as a light source in the second calibration pattern display system 7', a calibration error caused by the luminescence characteristic can be further reduced, thereby improving the calibration accuracy of the convergence measurement apparatus.

In the calibration, the cross-shaped calibration pattern 71a is successively displayed in pure colors of R, G, B by the calibration pattern display system 7 or 7'. Three calibration patterns 71a are successively sensed by the image pickup unit 2 arranged in front of and opposite to the chart plate 71. Using the three (in three colors) picked images, parameters (hereinafter, "operation parameters") including the hv-coordinates $(h_{j1O}, v_{j1O})$, $(h_{j2O}, v_{j2O})$(j=r, g, b) of the incident points $o_{j1'}$, $o_{j2'}$ of the optical axes $L_{J1}$, $L_{J2}$ on the sensing surfaces, the focal lengths $f_{j1J}$, $f_{j2J}$ (i=r, g, b; J=R, G, B) of the optical systems of the image pickup cameras 21, 22 for the respective color components R, G, B and the X-coordinates $X_{P1}$, $X_{P2}$ of the principal points P1, P2 of the taking lenses 211, 221 are calculated and determined as follows.

Specifically, it is assumed that Q(i)(i=1, 2, . . . ) denotes measurement points (intersections of the cross) of the calibration patterns 71a and the coordinates Q(i)(X(i), Y(i), Z(i)) are calculated in advance.

Assuming the coordinates of the focal points $I_{r1J}$, $I_{g1J}$, $I_{b1J}$ of the luminous images of the measurement points Q on the respective sensing surfaces of the CCDs 213R, 213G, 213B when the light of J (J=R, G, B) is emitted are $I_{r1J}(h_{r1J}, V_{r1J})$, $I_{g1J}(h_{g1J}, v_{g1J})$, $I_{b1J}(h_{b1J}, v_{b1J})$ and the coordinates thereof on the respective sensing surfaces of the CCDs 223R, 223G, 223B when the light of J (J=R, G, B) is emitted are $I_{r2J}(h_{r2J}, v_{r2J})$, $I_{g2J}(h_{g2J}, v_{g2J})$, $I_{b2J}(h_{b2J}, v_{b2J})$, these focal points $I_{r1J}$, $I_{g1J}$, $I_{b1J}$, $I_{r2J}$, $I_{g2J}$, $I_{b2J}$ are expressed as in Equations (54) to (59), (60) to (65) corresponding to Equations (8) to (13) and Equations (16) to (21).

$$h_{r1J}(i) = h_{r1O} + (X_J(i) - X_{P1}) \cdot f_{r1J}/(Z_J(i) - f_{r1J}) + \epsilon_{hr1J} \quad (54)$$

$$v_{r1J}(i) = v_{r1O} + Y_J(i) \cdot f_{r1J}/(Z_J(i) - f_{r1J}) + \epsilon_{vr1J} \quad (55)$$

$$h_{g1J}(i) = h_{g1O} + (X_J(i) - X_{P1}) \cdot f_{g1J}/(Z_J(i) - f_{g1J}) + \epsilon_{hg1J} \quad (56)$$

$$v_{g1J}(i) = v_{g1O} + Y_J(i) \cdot f_{g1J}/(Z_J(i) - f_{g1J}) + \epsilon_{vg1J} \quad (57)$$

$$h_{b1J}(i) = h_{b1O} + (X_J(i) - X_{P1}) \cdot f_{b1J}/(Z_J(i) - f_{b1J}) + \epsilon_{hb1J} \quad (58)$$

$$v_{b1J}(i) = v_{b1O} + Y_J(i) \cdot f_{b1J}/(Z_J(i) - f_{b1J}) + \epsilon_{vb1J} \quad (59)$$

where $\epsilon_{hr1J}$, $\epsilon_{hg1J}$, $\epsilon_{hb1J}$, $\epsilon_{vr1J}$, $\epsilon_{vg1J}$, $\epsilon_{vb1J}$ are measurement errors.

$$h_{r2J}(i) = h_{r2O} + (X_J(i) - X_{P2}) \cdot f_{r2J}/(Z_J(i) - f_{r2J}) + \epsilon_{hr2J} \quad (60)$$

$$v_{r2J}(i) = v_{r2O} + Y_J(i) \cdot f_{r2J}/(Z_J(i) - f_{r2J}) + \epsilon_{vr2J} \quad (61)$$

$$h_{g2J}(i) = h_{g2O} + (X_J(i) - X_{P2}) \cdot f_{g2J}/(Z_J(i) - f_{g2J}) + \epsilon_{hg2J} \quad (62)$$

$$v_{g2J}(i) = v_{g2O} + Y_J(i) \cdot f_{g2J}/(Z_J(i) - f_{g2J}) + \epsilon_{vg2J} \quad (63)$$

$$h_{b2J}(i) = h_{b2O} + (X_J(i) - X_{P2}) \cdot f_{b2J}/(Z_J(i) - f_{b2J}) + \epsilon_{hb2J} \quad (64)$$

$$v_{b2J}(i) = v_{b2O} + Y_J(i) \cdot f_{b2J}/(Z_J(i) - f_{b2J}) + \epsilon_{vb2J} \quad (65)$$

where $\epsilon_{hr2J}$, $\epsilon_{hg2J}$, $\epsilon_{hb2J}$, $\epsilon_{vr2J}$, $\epsilon_{vg2J}$, $\epsilon_{vb2J}$ are measurement errors.

In the calibration, first, the cross-shaped calibration patterns 71a are displayed only in pure colors R by the calibration pattern display system 7. Using images of the respective color components r, g, b obtained by picking up the image of the calibration patterns 71a by the image pickup unit 2, the hv-coordinates $(h_{j1O}, v_{j1O})$, $(h_{j2O}, v_{j2O})$(=r, g, b) of the incident points $o_{j1'}$, $o_{j2'}$ of the optical axes $L_{J1}$, $L_{J2}$, the focal lengths $f_{j1J}$, $f_{j2J}$ (3=r, g, b) and the X-coordinates $X_{P1}$, $X_{P2}$ of the principal points P1, P2 are so determined as to minimize a sum of squares of measurement errors $\epsilon_{hr1R}$, $\epsilon_{hr2R}$ of Equations (54) to (65).

There are a total of 20 operation parameters to be calculated: 12 hv-coordinates, 6 focal lengths and two principal points. For one measurement point, 12 relationships are defined by Equations (54) to (65). Accordingly, Equations (54) to (65) are set for at least two measurement points Q(1), Q(2), thereby establishing 24 relationships. The above 20 operation parameters are determined by performing a numerical calculation for these 24 Equations according to a known least squares method.

Subsequently, the cross-shaped calibration patterns 71a are successively displayed only in pure colors G and B. Using images of the respective color components r, g, b obtained by picking up the image of the calibration patterns 71a by the image pickup unit 2, the hv-coordinates $(h_{j1O}, v_{j1})$, $(h_{j2O}, v_{j2O})$(j=r, g, b) of the incident points $o_{j1'}$, $o_{j2'}$ of the optical axes $L_{J1}$, $L_{J2}$, the focal lengths $f_{j1J}$, $f_{j2J}$ (i=r, g, b, J=G, B) and the X-coordinates $X_{P1}$, $X_{P2}$ of the principal points P1, P2 are determined, respectively. These calculations are performed according to a numerical calculation method similar to the one adopted in the aforementioned case that the picked images of the calibration pattern 71a of R are used.

The determined operation parameters including the hv-coordinates $(h_{j1O}, v_{j1O})$, $(h_{j2O}, v_{j2O})$(j=r, g, b) of the incident points $o_{j1'}$, $o_{j2'}$ of the optical axes $L_{J1}$, $L_{J2}$, the focal lengths $f_{j1J}$, $f_{j2J}$ (j=r, g, b) and the X-coordinates $X_{P1}$, $X_{P2}$ of the principal points P1, P2 are stored in a memory 322 and used in the calculation of the misconvergence amounts by Equations (50) to (53).

In the above calibration, the hv-coordinates $(h_{j1O}, v_{j1O})$, $(h_{j2O}, v_{j2O})$(i=r, g, b) of the incident points $o_{j1'}$, $o_{j2'}$ of the optical axes $L_{J1}$, $L_{J2}$, the focal lengths $f_{j1J}$, $f_{j2J}$ (1=r, g, b) and the X-coordinates $X_{P1}$, $X_{P2}$ of the principal points P1, P2 are repeatedly calculated three times every time the image of the calibration patterns 71a by the emission of pure color lights R, G, B is picked up. Alternatively, the values determined in any one of the calculations (e.g., calculation using the picked image of the calibration patterns 71a of R) or average values of those obtained in the three calculations may be used as operation parameters.

This embodiment is described with respect to a simple optical model. The parameters can be determined for a model considering a distortion, a model consideration a wavelength dependency of the principal points P1, P2 of the taking lenses 211, 221, a model in which the optical axes $L_R$, $L_G$, $L_B$ of the respective color components and the principal points P1, P2 are not located in the same plane, and other models obtained by combining the above models according to a similar method.

As described above, the calibration pattern is made luminous with substantially the same luminescence characteristic as the color display 4 used in the measurement of the display characteristic. Accordingly, the wavelength dependencies of the focal lengths $f_{j1J}$, $f_{j2J}$ of the optical system including the taking lenses 21, 22 and the color separation prisms 212, 222 can be suitably corrected. This leads to an improvement in the measurement accuracy of the convergence measurement apparatus 1.

Figure 10:
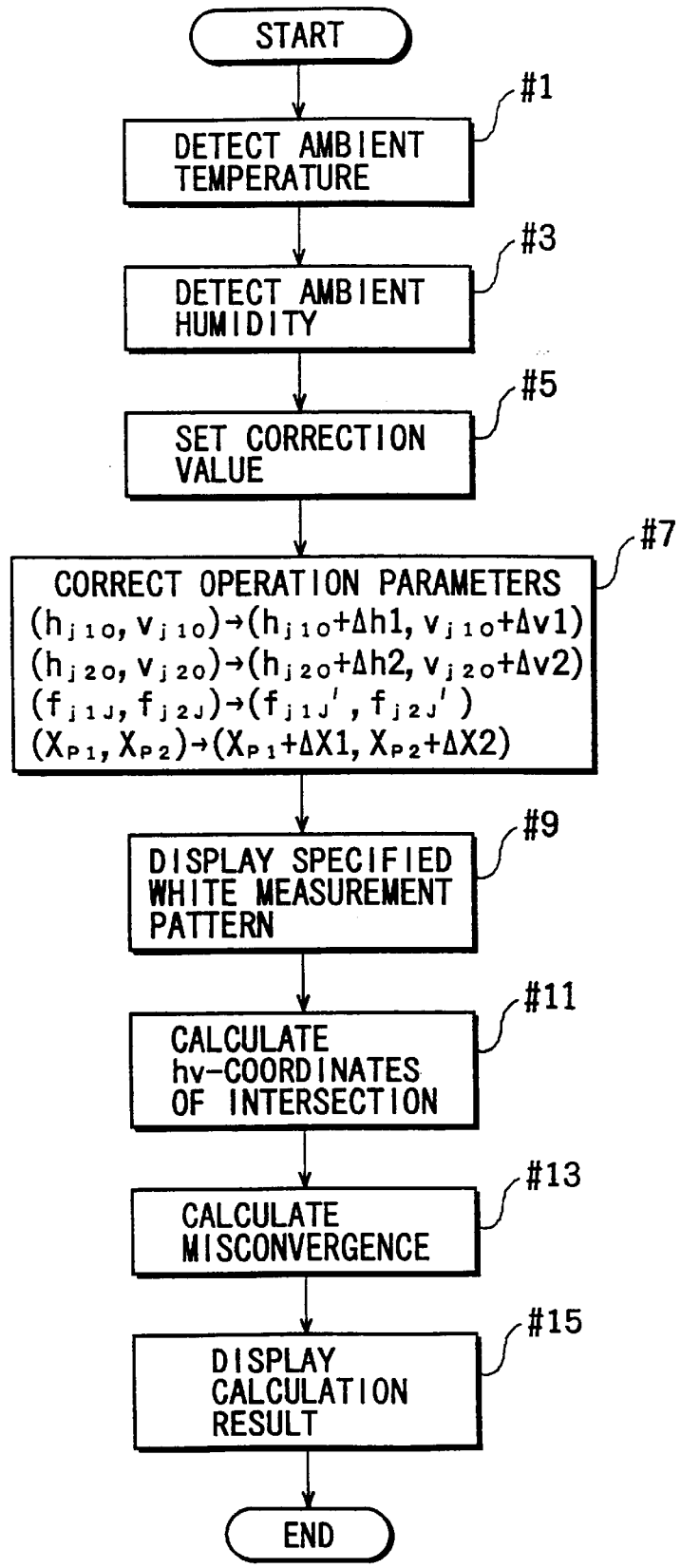
FIG. 10 is a flowchart showing an operation sequence of the convergence measurement.
Figure 11:
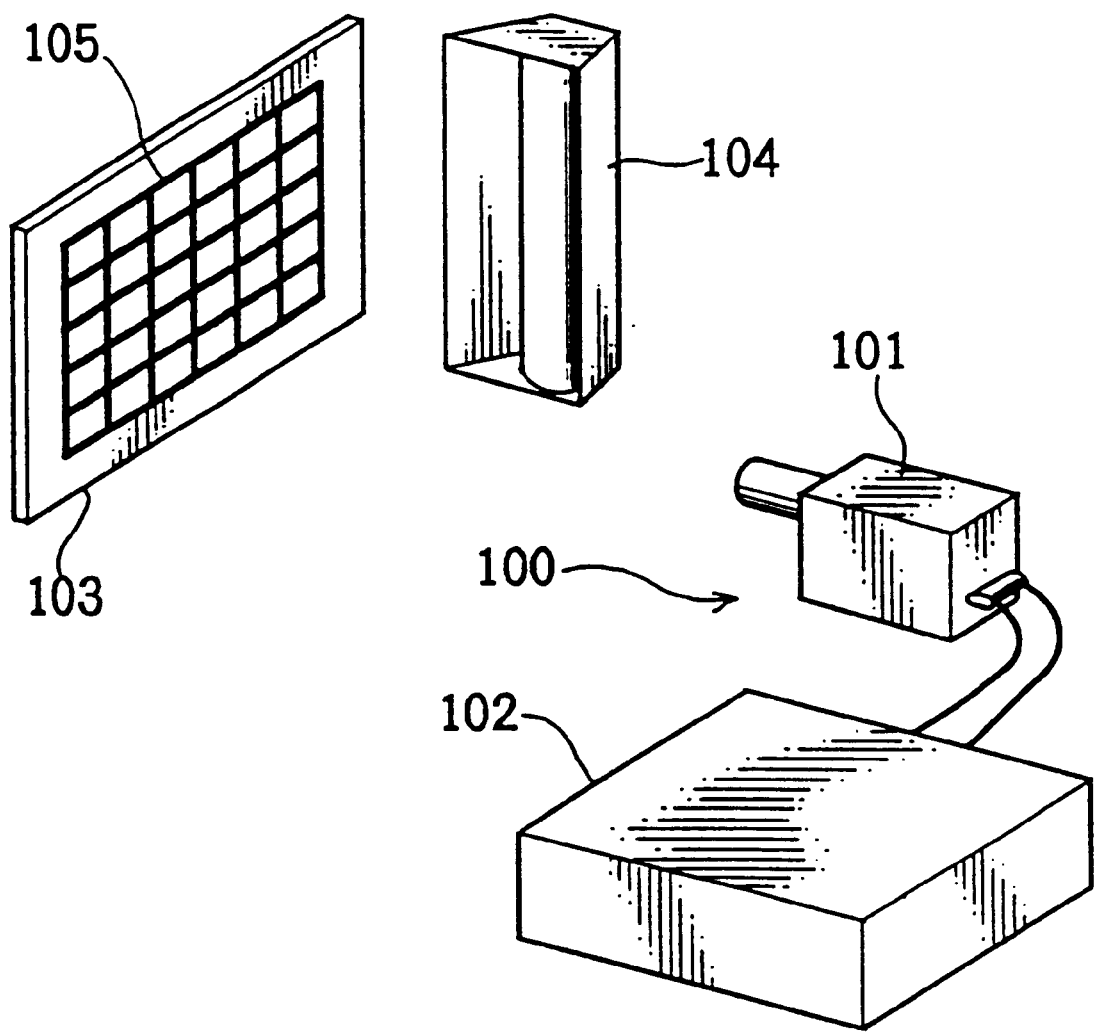
FIG. 11 is a perspective view showing a conventional method for calibrating a convergence measurement apparatus using a calibration chart.

Next, an operation sequence of the convergence measurement is described. FIG. 10 is a flowchart showing an operation sequence of the convergence measurement.

It is assumed that the operation parameters of the convergence measurement apparatus 1 are already set by the calibration pattern display system 7 prior to the convergence measurement.

The operation sequence shown in FIG. 10 include a calibration procedure (Steps #1 to #7) for correcting operation parameters based on temperature and humidity variations and a measurement procedure (Steps #9 to #15) for actually calculating a misconvergence amount. Unless the temperature and/or humidity largely vary, the operation parameters do not largely vary. Accordingly, the calibration procedure of FIG. 10 may be performed when the production line is started or when the measurement apparatus is transferred to a place having difference environments. It is advantageous to consider the temperature and humidity in setting the operation parameters during the calibration.

In FIG. 10, ambient temperatures T of the CCDs 213R, 213G, 213B and the CCDs 223R, 223G, 223B are detected by the temperature sensors 217R, 217G, 217B, 227R, 227G, 227B, and ambient temperatures T of the taking lenses 211, 221 are detected by the temperature sensors 219, 220, 229, 230 (Step #1). Further, ambient humidities W of the CCDs 213R, 213G, 213B and the CCDs 223R, 223G, 223B are detected by the humidity sensors 218R 218G, 218B, 228R, 228G, 228B (Step #3).

Subsequently, correction values ($\Delta h1$, $\Delta h2$, $\Delta v1$, $\Delta v2$, $\Delta X1$, $\Delta X2$, $\Delta f1$, $\Delta f2$, etc.) of the operation parameters are set based on the detected temperatures T and humidities W (Step #5). These correction values are set using a conversion table stored in advance in the memory 331. Then, the operation parameters are corrected using the set correction values (Step #7). For example, the hv-coordinates ($h_{j1O}$, $v_{j1O}$), ($hi_{2O}$, $v_{j2O}$)(j=r, g, b) of the incident points $o_{j1'}$, $o_{j2'}$ of the optical axes $L_{J1}$, $L_{J2}$ are corrected into ($h_{j1O}+\Delta h1$, $v_{j1O}+\Delta v1$), ($h_{j2O}+\Delta h2$, $v_{j2O}+\Delta v2$); the X-coordinates $X_{P1}$, $X_{P2}$ of the principal points P1, P2 are corrected to $X_{P1}+\Delta X1$, $X_{P2}+\Delta X2$; and the focal lengths $f_{j1J}$, $f_{j2J}$ (j=r, g, b, J=R, G, B) are corrected to $f_{j1J}+\Delta f1$, $f_{j2J}+\Delta f2$.

Subsequently, a specified white measurement pattern is displayed on the color display 4 (Step #9). This measurement pattern is displayed in such a size that at least one intersection Q falls within the sensing frame of the image pickup unit 2.

An image of the measurement pattern is then picked up by the image pickup device 2 and the hv-coordinates of the focal points $I_{r1J}(h_{r1J}, v_{r1J})$, $I_{g1J}(h_{g1J}, v_{1J})$, $I_{b1J}(h_{b1J}, v_{b1J})$, $I_{r2J}(h_{r2J}, v_{r2J})$, $I_{g2J}(h_{g2J}, v_{g2J})$) $I_{b2J}(h_{b2J}, v_{b2J})$ of the CCDs 213R, 213G, 213B, 223R, 223G, 223B corresponding to the intersection Q are calculated using the picked image (Step #11).

Subsequently, using the calculated hv-coordinates of the incident points $o_{r1'}$, $o_{g1'}$, $o_{b1'}$, $o_{r2'}$, $o_{g2'}$, $o_{b2'}$ of the optical axes $L_{R1}$, $L_{G1}$, $L_{B1}$, $L_{R2}$, $L_{G2}$, $L_{B2}$, hv-coordinates of the focal points $I_{r1J}$, $I_{g1J}$, $I_{b1J}$, $I_{r2J}$, $I_{g2J}$, $I_{b2J}$ and the coordinates of the principal points P1, P2 of the taking lenses 211, 221, the horizontal direction (X-direction) misconvergence amounts $\Delta D_{RGX}$, $\Delta D_{BGX}$ are calculated by Equations (50), (51) and the vertical direction (Y-direction) misconvergence amounts $\Delta D_{RGY}$, $\Delta D_{BGY}$ are calculated by Equations (52), (53) (Step #13). Then, the measurement ends after the calculation results are displayed in a specified display format on the display device 36 (Step #15).

Since the ambient temperatures and ambient humidities of the taking lenses 211, 221 and the CCDs 213R to 213B, 223R to 223B of the image pickup unit 2 are detected and the operation parameters in Equations (50) to (53) for calculating the misconvergence amounts (53) are corrected based on the detection results, the convergence can be measured with high accuracy.

The foregoing embodiment is described with respect to the convergence measurement apparatus 1 of the type in which the image of the measurement pattern is picked up according to the stereoscopic method using the image pickup unit 2 provided with a pair of image pickup cameras 21, 22. However, according to the invention, the image of the measurement pattern is not necessarily picked according to the stereoscopic method. For example, the invention is also applicable to a display characteristic measurement apparatus using an image pickup unit provided with a single image pickup camera.

Although the convergence measurement apparatus for a color CRT is described in the foregoing embodiment, the display characteristic measurement apparatus according to the invention is also applicable to color display apparatus such as a projection type color display, a color LCD, and a color plasma display or to the measurement of a luminance center position of a monochromatic display device or the measurement of a geometric image distortion.

Although the image pickup unit including three CCDs of primary colors is described in the foregoing embodiment, the image pickup unit is not limited to this type. It may include two image pickup devices (may be pickup tubes), and the color filters may be of primary color type or complimentary color type.

As described above, a calibration pattern is made luminous at substantially the same luminescence characteristic as that of the color display apparatus to be measured in the calibration pattern display system for calibrating the display characteristic measurement apparatus. Accordingly, the likelihood of a calibration error caused by a difference between the luminescence characteristic of the calibration pattern and that of the color display apparatus is reduced, with the result that the measurement accuracy is improved.

Further, the calibration pattern display system includes the chart plate through which only the calibration pattern is transmittable and the light source which has substantially the same luminescence characteristic as that of the color display apparatus to be measured and illuminates the chart plate from behind. Thus, the construction of the calibration pattern display system can be simplified.

Particularly, by using the color display apparatus to be measured as the light source, the construction of the calibration pattern display system can be more simplified.

Further, it is made possible to pick up an image of the calibration pattern luminous in color components of the luminescent color of the color display apparatus to be measured by providing the emission controller for causing the light source to emit light so as to successively illuminate the calibration pattern at substantially the same luminescence characteristic as the color components of the luminescent color of the color display apparatus. Accordingly, a measurement error caused by the construction of the image pickup optical system of the display characteristic measurement apparatus can be corrected for each color component of the luminescent light, thereby further improving the calibration accuracy.

Further, in the display characteristic measurement apparatus with which a measurement error caused by the construction of the image pickup optical system is corrected using the above calibration pattern display system, the focal point of the calibration pattern on the sensing surface is calculated using the picked image of the calibration pattern, and the operation parameters relating to the image pickup optical system in the calculation for calculating the display characteristic are set based on the above calculation result and the display position of the calibration pattern on the display surface of the color display apparatus. Accordingly, the likelihood of a calibration error caused by a difference between the luminescence characteristic of the calibration pattern and that of the color display apparatus is reduced, with the result that the measurement accuracy is improved.

Since the operation parameters are set for each color component of the luminescent color of the calibration pattern, an error in setting the operation parameters occurs with a less likelihood, with the result that the measurement accuracy is further improved.

Further, since the operation parameters concerning at least the focal length and principal points of the optical system, and the position of the sensing surface with respect to the optical axis of the image pickup system are set, the likelihood of the measurement errors resulting from displacements of the taking lens and the sensing surface of the image pickup optical system from the reference positions and a displacement of the wavelength of the measurement color from a reference wavelength can be reduced.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A calibration pattern display system for displaying a calibration pattern to be used for calibrating a display characteristic measurement apparatus for measuring a display characteristic of a display apparatus, the calibration pattern display system comprising:

a display unit which displays the calibration pattern at substantially the same luminescence characteristic as the luminescence characteristic of the display apparatus to be measured, wherein the calibration pattern is used for calibrating the display characteristic measurement apparatus.

2. A calibration pattern display system according to claim 1, wherein the display unit includes:

a light source having substantially the same luminescence characteristic as the luminescence characteristic of the display apparatus; and a chart plate provided between the light source and the display characteristic measurement apparatus, and formed with a transparent portion having a specified shape.

3. A calibration pattern display system according to claim 2, wherein the light source is the display apparatus.

4. A calibration pattern display system according to claim 1, wherein the display apparatus is operable to display in color, and the display unit display the calibration pattern at substantially the same luminescence characteristic as the luminescence characteristic of each color component of the display apparatus.

5. A system for calibrating a display characteristic measurement apparatus for measuring a display characteristic of a display apparatus, the system comprising:

a calibration pattern display unit which displays a calibration pattern at substantially the same luminescence characteristic as the luminescence characteristic of the display apparatus to be measured;

an image pickup unit which is provided in the display characteristic measurement apparatus, and picks up the calibration pattern displayed on the display apparatus generate image data; and a calculator which calculates, based on the image data generated by the image pickup unit, calibration data for the display characteristic measurement apparatus, wherein the calibration pattern is used for calibrating the display characteristic measurement apparatus.

6. A system according to claim 5, wherein the calibration pattern display unit includes:

a light source having substantially the same luminescence characteristic as the luminescence characteristic of the display apparatus; and a chart plate provided between the light source and the display characteristic measurement apparatus, and formed with a transparent portion having a specified shape.

7. A system according to claim 5, wherein the display characteristic measurement apparatus includes a display portion for displaying a measurement result.

8. A system according to claim 5, wherein the calculator includes:

a focusing position calculating portion which calculates, based on the image data generated by the image pickup unit, a focusing position of the calibration pattern on an image sensing surface of the image pickup unit; and an operation parameter setting portion which sets, based on a display position of the calibration pattern on a display surface of the calibration pattern display unit and a calculated focusing position, an operation parameter for calculating the display characteristic of the display apparatus.

9. A system according to claim 8, wherein the calibration pattern display unit displays the calibration pattern in color, and the operation parameter setting portion sets an operation parameter for each color component of the calibration pattern.

10. A system according to claim 8, wherein the image pickup unit includes an optical system having a taking leans for introducing a light image of the calibration pattern onto the image sensing surface, and the operation parameter setting portion sets the operation parameter about at least one of a focal length of the optical system, a principal point of the taking lens, and an optical axis of the optical system with respect to the image sensing surface.

11. A system according to claim 8, further comprising a detector which detects an ambient condition of the image pickup unit, wherein the operation parameter setting portion corrects a calculated operation parameter based on a detected ambient condition.

12. A system according to claim 5, wherein the display characteristic measurement apparatus is operable to measure a misconvergence amount of a color display apparatus.

13. A system according to claim 12, further comprising a pattern generator which generates a pattern image for measurement of misconvergence on the color display apparatus.

14. A method for calibrating a display characteristic measurement apparatus for measuring a display characteristic of a display apparatus, the method comprising the steps of:

displaying a calibration pattern at substantially the same luminescence characteristic as the luminescence characteristic of the display apparatus to be measured;

picking up a displayed calibration pattern by an image pickup unit of the display characteristic measurement apparatus to be calibrated, and generating image data corresponding to the displayed calibration pattern;

calculating, based on the generated image data, a focusing position of the calibration pattern on an image sensing surface of the image pickup unit; and setting, based on a display position of the calibration pattern and a calculated focusing position, and operation parameter for calculating the display characteristic of a display apparatus.

15. A method according to claim 14, wherein the calibration pattern is displayed by:

a light source having substantially the same luminescence characteristic as the luminescence characteristic of the display apparatus; and a chart provided between the light source and the display characteristic measurement apparatus, and formed with a transparent portion having a specified shape.

16. A method according to claim 15, further comprising the steps of:

detecting an ambient condition of the image pickup unit; and correcting a calculated operation parameter based on a detected ambient condition.

* * * * *